Figure 1:
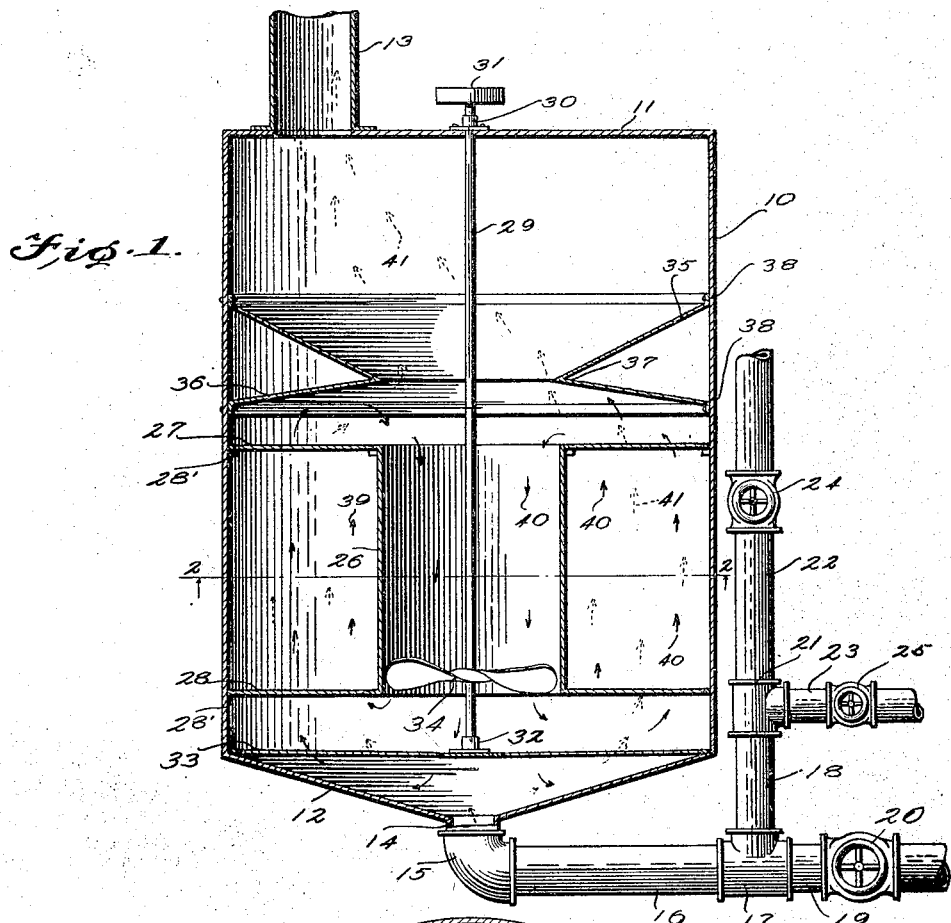

June 10, 1924.

F. KASPAR

CARBONATOR

Filed May 13, 1921

1,497,214

WITNESSES

INVENTOR
Frank Kaspar,
BY
ATTORNEYS

Patented June 10, 1924.

1,497,214

UNITED STATES PATENT OFFICE.

FRANK KASPAR, OF SANTA MARIA, CALIFORNIA.

CARBONATOR.

Application filed May 13, 1921. Serial No. 469,224.

*To all whom it may concern:*

Be it known that I, FRANK KASPAR, a citizen of the United States, and a resident of Santa Maria, in the county of Santa Barbara and State of California, have invented certain new and useful Improvements in Carbonators, of which the following is a specification.

This invention relates to a carbonator. As is well known in the manufacture of beet sugar, the first step of purifying the sugar extracted from the beets is to carbonate the same.

In carrying out this carbonization the beet juice is collected in a suitable tank, after which a certain amount of milk of lime is added thereto and the mixture is then carbonated by introducing carbon-dioxide gas under pressure.

It is the common practice to introduce this gas by means of perforated pipes, or inverted serrated hoods located near the bottom of the tank. In first introducing the gas by such a means, the mixture of juice and lime always has a tendency to rise several feet in the tank before the gas breaks through and the carbonization actually begins.

Also it may be mentioned that during the latter part of the season when beets are being harvested they are mostly frozen or partly spoiled and the viscosity of the juice extracted therefrom becomes such that when carbonating the juice is quite frequently carried to the top of the tank and out through the vent stack associated with the tank, and in this way becomes a total loss. Sometimes this overflow is caught in catchalls or foam headers whence it is taken at intervals or when a certain amount has accumulated, and again emptied into the carbonating tank. The juice collected in this manner is often in a state of decomposition and thus offers a source of contamination for the pure juice with which it comes in contact when poured into the carbonating tank.

It also may be here mentioned that it is the practice to fill the carbonating tanks to a height of from four to six feet with the beet juice. The carbonated gas is then introduced at the bottom of the tank and the carbonization will take place more rapidly at that point than at a higher point in the tank due to the fact that the gas becomes exhausted on nearing the top of the tank.

In many instances to get a uniform carbonization of the juice throughout the tank, a mechanical agitator is resorted to which combined with the agitation caused by the gas when being introduced under pressure in a way gives a more or less thorough carbonization of the juice. However, these methods have not been found entirely satisfactory.

Furthermore, it is extremely important that the carbonization of the juice should cease as soon as it has reached a stage where it will filter, and it therefore becomes important that the process for carbonating the juice should be carried on in such a manner as to insure that its action is uniform and thus enabling a certain volume of juice to be carbonated at one time.

With that heretofore set out in mind, it is the object of the present invention to provide a carbonator tank in which a quantity of beet juice therein may be uniformly carbonated.

It is also an object of the invention that any loss due to the overflow of the juice previously mentioned during carbonization will be obviated.

Other objects will hereinafter appear.

Figure 2:
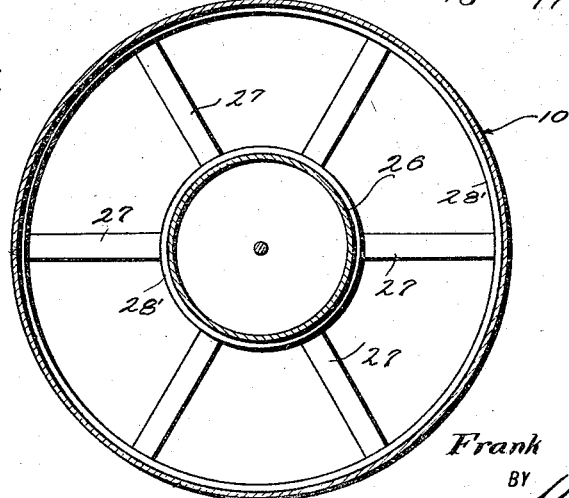

The invention is illustrated by way of example in the accompanying drawings, in which:

Figure 1 is a vertical central sectional view of a carbonator tank embodying my invention, Figure 2 is a transverse section taken substantially on the lines 2—2 of Figure 1.

Referring to the drawings more particularly, 10 indicates a tank which is preferably cylindrical in shape as shown, and formed with an upper end closure 11 and a conical shaped bottom 12. In the top 11, there is provided an opening which communicates with a vent stack 13, said vent stack being suitably secured to the top of the tank, as shown. The apex of the bottom 12 terminates in a nipple 14 to which there is threaded an elbow 15 which in turn communicates with the one end of a pipe 16. The pipe 16 carries on its one end a T-fitting 17 which communicates with the pipes 18 and 19. The pipe 19 is provided with a valve 20 and the pipe 18 communicates with a T-fitting 21, said T-fitting in turn communicating with the pipes 22 and 23, and the pipes 22 and 23 each being provided with a valve 24 and 25 respectively. The pipe 22 may be connected with an elevated tank in which beet juice is collected, while the pipe 23 may be connected with a suitable source of carbon-dioxide gas under pressure, and the pipe 19 suitably connected with a tank or container in which the beet juice may be collected after the same has been carbonated.

Within the tank 10 there is positioned a short cylindrical member 26 which is held centrally of the tank by the radial supporting arms 27 and 28, the arms 27 extending from the upper end of the member and the arms 28 extending from the lower end thereof, said arms at their outer ends being seated upon suitable lugs 28' formed on the interior of the tank 10, as shown. A shaft 29 extends through the cylindrical member 26 and has its upper end journaled in a bearing member 30, which is secured to the top 11 of the tank, as shown. On the upper end of the shaft there is carried a pulley 31 by which said shaft may be driven. The lower end of the shaft is rotatably supported in a bearing 32 which is likewise supported by the radial arms 33, the outer ends of said arms being suitably seated on the bottom of the tank, as shown. Above the bearing 32 there is secured on the shaft a propeller 34, said propeller being positioned with relation to the tank, as shown.

Above the cylindrical member 26 there is secured a pair of conical-shaped plate members 35 and 36, the member 36 serving as a deflector and having its inner portion formed with an enlarged opening which is in axial alinement with the cylindrical member 26, and also registering with a similar opening formed in the like portion of the conical shaped member 35. The two members 35 and 36 are preferably integrally connected about their peripheries which form the central openings referred to as at 37, and also each member has formed at its base portion a flange 38 by which said members may be secured to the walls of the tank 10 by the means of bolts or rivets, as shown.

In the operation of the present device, the valves 25 and 20 are closed and the valve 24 is open to permit beet juice to flow from the tank with which the pipe 22 is connected into the tank 10. The beet juice is allowed to fill the tank 10 to a point slightly below the deflector plate 36. At this time the propeller 34 is started and the valve 25 opened to permit carbon dioxide gas to enter the tank 10. The action of the propeller 34 will be to cause juice to travel in the two circuitous paths indicated by the arrows 39 and 40.

Gas entering through the nipple 14 will proceed upwardly through the body of juice and comingle therewith to form a complete and uniform carbonization thereof. Of course, as is obvious, the downward current of the juice in the interior of the cylindrical member 26 will deflect the upward travelling gas so that it will likewise travel on the outside of the cylindrical member 26. The churning action of the propeller 34 and the upward travel of the gas taken together will cause a substantial carbonization of the juice at the bottom of the tank, and said carbonization uniformly proceeding as the gas continues to move upward with the flow of the juice on each side of the cylindrical member 26. In case there is considerable foam or a tendency of the juice within the tank to rise, the same is deflected or held downwardly by the means of the deflecting plate 36.

Also in case the juice does rise within the top of the tank the same may be returned by the conical shaped drain plate 35. The path of the dioxide gas is clearly shown by the dotted arrows 41 and as also seen, any excess thereof may escape through the vent stack 13.

I claim :—

1. A carbonator of the class described, comprising a tank, a vent-stack communicating with the interior of the tank at the upper end thereof, a conical shaped deflector plate positioned intermediate the botton and top of said tank and having a central opening, an inverted conical shaped drain plate positioned above said deflector plate and having a central opening in register with the opening of the first named deflector plate, means for introducing a liquid into the tank, means for agitating said liquid to travel in a circuitous path within said tank and beneath said deflector plate, and means for introducing a gas in the bottom of said tank.

2. A carbonator of the character described, comprising a tank, a deflector plate between the top and bottom of said tank having a central opening, a casing arranged below said deflector plate and said casing having both its ends open and being disposed in longitudinal alignment with the opening in said deflector plate, means for introducing a liquid into bottom of tank, agitating means for causing the liquid within said tank to travel downwardly through the interior of said casing and upwardly about the sides thereof, and means for introducing a gas into the bottom of said tank.

3. A carbonator comprising a tank having a vent communicating with the upper end thereof, a deflector plate positioned between intermediate the top and bottom of said tank, said deflector plate having a central opening, a cylindrical member arranged below said deflector plate and in axial alignment therewith, a pipe connection for the bottom of said tank, means whereby either a gas or a liquid may be introduced through said tank, means for supporting a propeller within the cylindrical member and means whereby said propeller may be rotated to cause a circulation of the liquid downwardly through the cylindrical member and upwardly about the sides thereof.

FRANK KASPAR.